US012654664B2

(12) United States Patent
Weh et al.

(10) Patent No.: US 12,654,664 B2
(45) Date of Patent: Jun. 16, 2026

(54) PEDAL TRAVEL SIMULATOR FOR A HYDRAULIC VEHICLE POWER BRAKING SYSTEM

(71) Applicant: Robert Bosch GmbH, Stuttgart (DE)

(72) Inventors: Andreas Weh, Sulzberg (DE); Martin Hagspiel, Rettenberg (DE); Maximilian Wilhelm, Buchenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 639 days.

(21) Appl. No.: 17/793,022

(22) PCT Filed: Jan. 18, 2021

(86) PCT No.: PCT/EP2021/050908
§ 371 (c)(1),
(2) Date: Jul. 14, 2022

(87) PCT Pub. No.: WO2021/197676
PCT Pub. Date: Oct. 7, 2021

(65) Prior Publication Data
US 2023/0047674 A1      Feb. 16, 2023

(30) Foreign Application Priority Data

Apr. 3, 2020      (DE) ..................... 10 2020 204 352.3

(51) Int. Cl.
B60T 8/40              (2006.01)
(52) U.S. Cl.
CPC .................................... B60T 8/409 (2013.01)

(58) Field of Classification Search
CPC ...... B60T 8/4081; B60T 8/409; B60T 8/4086;
B60T 2220/04; B60T 2270/10; B60T
2270/602
See application file for complete search history.

(56) References Cited

U.S. PATENT DOCUMENTS

| | | | | | |
|---|---|---|---|---|---|
| 2,708,110 | A | * | 5/1955 | Clay ......................... | F16F 1/32 |
| | | | | | 267/162 |
| 10,053,073 | B2 | * | 8/2018 | Weh ......................... | B60T 8/409 |
| 10,087,961 | B2 | * | 10/2018 | Schepp ................... | B60T 15/36 |
| 10,507,812 | B2 | * | 12/2019 | Weh ......................... | B61H 1/00 |
| 2016/0031424 | A1 | * | 2/2016 | Weh ......................... | B60T 8/409 |
| | | | | | 60/533 |

(Continued)

FOREIGN PATENT DOCUMENTS

| | | |
|---|---|---|
| CN | 204172892 U | 2/2015 |
| CN | 109153375 A | 1/2019 |

(Continued)

OTHER PUBLICATIONS

International Search Report for PCT/EP2021/050908, Issued May 17, 2021.

*Primary Examiner* — Robert A. Siconolfi
*Assistant Examiner* — Mahbubur Rashid
(74) *Attorney, Agent, or Firm* — NORTON ROSE FULBRIGHT US LLP

(57) ABSTRACT
A stroke of a piston of a pedal travel simulator is limited via a spring ring that is inserted into a circumferential groove in a cylinder of the pedal travel simulator. The spring ring relieves the load on a cover of the pedal travel simulator that closes the cylinder of the pedal travel simulator.

19 Claims, 1 Drawing Sheet

(56)     References Cited

U.S. PATENT DOCUMENTS

| 2016/0160892 A1* | 6/2016 | Schepp | .............. F15B 15/1428 |
| | | | 29/464 |
| 2018/0362006 A1* | 12/2018 | Weh | ......................... G05G 5/03 |
| 2019/0232934 A1* | 8/2019 | Weh | ........................ B60T 8/409 |
| 2019/0270438 A1* | 9/2019 | Weh | ........................ B60T 8/409 |

FOREIGN PATENT DOCUMENTS

| CN | 109982904 A | | 7/2019 | |
| CN | 110418740 A | * | 11/2019 | |
| DE | 19836139 A1 | | 3/1999 | |
| DE | 102016222567 A1 | * | 5/2018 | .............. B60T 7/042 |
| DE | 102017210041 A1 | | 12/2018 | |
| DE | 102017216001 A1 | | 3/2019 | |
| DE | 102018214869 A1 | * | 3/2020 | |
| EP | 3225478 B1 | * | 3/2019 | .............. B60T 13/58 |
| JP | 2019099044 A | * | 6/2019 | |
| KR | 20150122425 A | | 11/2015 | |
| WO | WO-2020059325 A1 | * | 3/2020 | ............ B60T 13/142 |

* cited by examiner

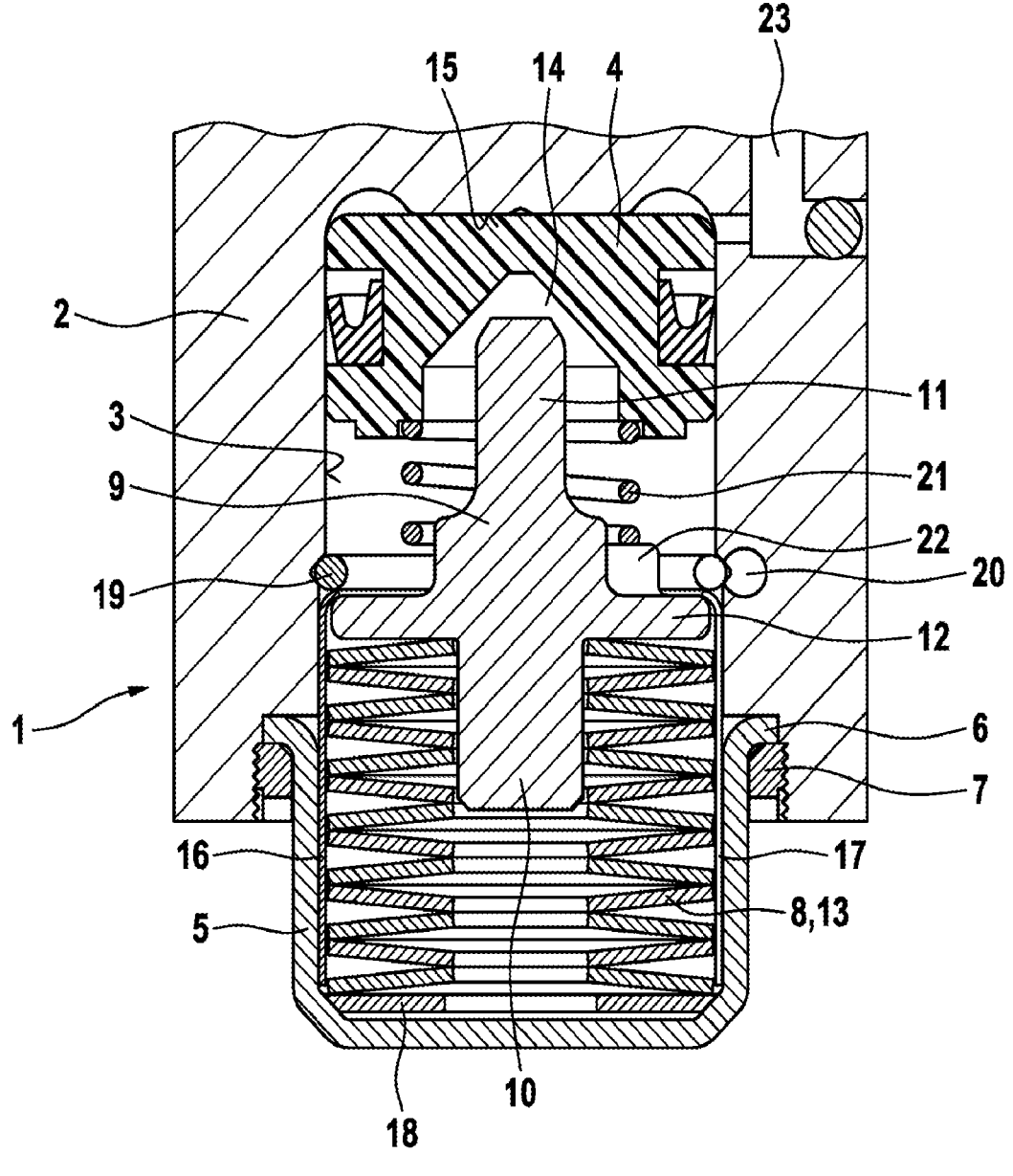

PEDAL TRAVEL SIMULATOR FOR A HYDRAULIC VEHICLE POWER BRAKING SYSTEM

FIELD

The present invention relates to a pedal travel simulator.

BACKGROUND INFORMATION

In hydraulic vehicle power braking systems, pedal travel simulators allow pedal travel (for a hand brake, lever travel) for actuating a master brake cylinder. For power brake actuation, the master brake cylinder is used as a setpoint generator for a hydraulic brake pressure that is generated not via the master brake cylinder, but, rather, using external energy, for example with a hydropump or a piston-cylinder unit. During power braking, the master brake cylinder is or becomes hydraulically disconnected from the remainder of the vehicle braking system, for example by closing a valve, and when actuated it displaces brake fluid into the pedal travel simulator, which communicates with the master brake cylinder during the power braking.

German Patent Application No. DE 10 2017 210 041 A1 describes a pedal travel simulator including a piston that is axially displaceable in a cylinder, and a helical compression spring as a piston spring that acts on the piston to move it into the cylinder. The piston spring is accommodated in a cup-shaped cover that is situated at an end face of the cylinder, axially lengthening the cylinder, and that closes the cylinder in a fluid-tight manner.

SUMMARY

A pedal travel simulator according to the present invention is provided for connection to a muscle power-actuatable master brake cylinder of a hydraulic vehicle power braking system. In accordance with an example embodiment of the present invention, the pedal travel simulator includes a cylinder and a piston that is axially displaceable in the cylinder. A cup-shaped cover closes an end face of the cylinder, preferably in a fluid-tight manner. "Cup-shaped" means in particular tubular, and specifically, cylindrical tube-shaped with an open end face and a closed end face, the open end face facing the cylinder.

A first spring element that acts on the piston to move it into the cylinder is situated in the cover. The first spring element may be a helical compression spring, for example, and in particular is a disk spring packet. The first spring element may act on the piston directly or indirectly via some other component, and does not have to act on the piston over its entire stroke.

To limit a stroke of the piston in the direction of the cover, an example embodiment of the present invention provides a spring ring that is inserted into a circumferential groove between the piston and the cover and that protrudes inwardly from the groove, so that the spring ring forms a piston stop that limits the stroke of the piston in the direction of the cover. The piston stop keeps the cover free of a piston force due to a brake pressure that acts on the piston on a side facing away from the cover. In addition, the spring ring that forms the piston stop limits an elastic force with which the first spring element is supported in the cover, due to the fact that the limitation of the stroke of the piston at the same time also limits a tensioning distance of the first spring element.

Refinements and advantageous embodiments of the present invention are disclosed herein.

One example embodiment of the present invention provides a fitting that holds the first spring element in the cover of the pedal travel simulator and, if the first spring element is a disk spring packet, in particular also holds its disk springs together. The fitting allows movement of the first spring element for tensioning the first spring element. The cover, the fitting, and the first spring element form a pre-assembled unit which may be put together before the pedal travel simulator is assembled, and which simplifies the assembly of the pedal travel simulator according to the present invention.

All features disclosed in the description and in the FIGURE may be implemented individually or in basically any combination in specific embodiments of the present invention. Embodiments of the present invention that do not include all, but instead only one or more, features of a specific embodiment of the present invention are possible in principle.

BRIEF DESCRIPTION OF THE DRAWING

The present invention is explained in greater detail below based on one specific embodiment illustrated in the FIGURE.

The single FIGURE shows an axial section of a pedal travel simulator according to the present invention.

DETAILED DESCRIPTION OF EXAMPLE EMBODIMENTS

Pedal travel simulator 1 according to the present invention illustrated in the drawing is situated in a hydraulic block 2 of a brake pressure and slip control system of a hydraulic vehicle power braking system, not illustrated. Hydraulic block 2 is a cuboidal metal block with receptacles for solenoid valves and further components of the brake pressure and slip control system, which are connected to one another via boring of hydraulic block 2 corresponding to a circuit diagram of the hydraulic vehicle braking system. Such hydraulic blocks 2 and brake pressure and slip control systems are conventional, and are not discussed here in further detail.

Hydraulic block 2 includes a cylindrical blind hole that forms a cylinder 3 of pedal travel simulator 1. A piston 4 is axially displaceably accommodated in cylinder 3.

A cylindrical tube-shaped cover 5 with an open end and a closed end closes an end face of cylinder 3 in a fluid-tight manner, the open end of cover 5 facing cylinder 3. Due to its shape, cover 5 may be referred to as "cup-shaped." In the exemplary embodiment, the cover is manufactured as a deep-drawn part made of sheet metal, which, however, is not mandatory for the present invention.

At its open end, cover 5 includes a circumferential, outwardly projecting flange 6 at which the cover is fastened to cylinder 3, in the manner of a union nut, via a threaded ring 7 that is screwed into cylinder 3 at an opening.

A disk spring packet as a first spring element 8 is situated in cover 5.

Situated between piston 4 and first spring element 8 is a force transmitter 9 that includes two tappets 10, 11 which protrude coaxially from a flange 12 of force transmitter 9 in opposite directions. One of the two tappets 10 protrudes into center holes of disk springs 13 of the disk spring packet, which forms first spring element 8 of pedal travel simulator 1 and centers or guides disk springs 13.

The other tappet 11 protrudes into a conical, coaxial depression 14 in piston 4; tappet 11 does not rest against a base of depression 14 when piston 4, as shown, is situated at a base 15 of cylinder 3, so that piston 4 may move a short distance without force transmitter 9. When tappet 11 of force transmitter 9 rests against the base of depression 14 of piston 4, and flange 12 of force transmitter 9 rests against first spring element 8, first spring element 8 transmits its elastic force to piston 4.

Pedal travel simulator 1 includes a fitting 16 for first spring element 8 or for disk springs 13 of its disk spring packet. In the exemplary embodiment, fitting 16 is a cylindrical tube-shaped sleeve with a continuous elongated slot 17, so that the fitting is radially elastic and radially resilient. Fitting 16 rests inwardly against cover 5 with pretensioning, so that it is clampingly held in cover 5. In the exemplary embodiment, fitting 16, the same as first spring element 8, is axially longer than cover 5 and therefore protrudes from cover 5 into cylinder 3, which, however, is not mandatory for the present invention.

Also possible, for example, is a fitting 16, without an elongated slot 17, that is pressed into cover 5, and/or a fitting 16 that is not precisely circular and/or that includes outwardly projecting corrugations, nipples, or the like and is thus clampingly held in cover 5. The listing serves to illustrate alternatives, and is not exhaustive.

At an end facing piston 4, an edge of fitting 16 is reshaped to project inwardly and engages over flange 12 of force transmitter 9, as the result of which fitting 16 holds force transmitter 9 at flange 12 of the fitting, and via flange 12 holds first spring element 8 in cover 5. Cover 5, fitting 16, force transmitter 9, and first spring element 8 form a pre-assembled unit which may be put together before pedal travel simulator 1 is assembled, and which simplifies the assembly of pedal travel simulator 1.

First spring element 8 is axially movable in fitting 16, so that it may be axially elastically compressed, i.e., tensioned, by piston 4 via force transmitter 9. Fitting 16 forms a guide for first spring element 8.

Situated in cover 5, between its closed end and first spring element 8, is a perforated disk as a support disk 18, whose diameter is almost as large as an inner diameter of cover 5. Support disk 18 therefore rests inwardly against cover 5 close to the circumference, at a transition from a circumferential wall to the closed end of cover 5, and thus transfers the elastic force of first spring element 8 close to the circumference to cover 5, as the result of which the elastic force acts essentially as a tensile force in the circumferential wall of cover 5, and has little or no effect in the closed end of cover 5. "Close to the circumference" means without any distance, or with a distance at most of approximately a wall thickness of the cover 5, from the inner circumference of cover 5.

Between flange 12 of force transmitter 9 and piston 4, cylinder 3 includes a circumferential, in the exemplary embodiment V-shaped, groove into which a spring ring 19 which protrudes inwardly from the groove is inserted, and which forms a piston stop that limits a stroke of piston 4 in the direction of cover 5. When piston 4 rests against spring ring 19, first spring element 8 is not tensioned further and its elastic force does not further increase, even if a hydraulic pressure on a side of piston 4 facing away from first spring element 8 further increases. In this way, spring ring 19 limits the elastic force with which first spring element 8 presses inwardly against cover 5. In addition, spring ring 19 prevents first spring element 8 from "going to block," i.e., pressing together of windings of a helical compression spring, if first spring element 8 is a helical compression spring, or flattening and flat pressing together of disk springs 13, if first spring element 8 is a disk spring packet.

A relief bore 20, through which brake fluid may flow in and out from cover 5 and from cylinder 3 on a side of piston 4 facing cover 5 when piston 4 moves in cylinder 3, leads in at a base of the groove into which spring ring 19 is inserted. In the exemplary embodiment, relief bore 20 tangentially intersects the groove at its base; however, relief bore 20 may also lead in from some other direction, for example may open axially parallel into the groove (not illustrated).

Situated between flange 12 of force transmitter 9 and piston 4 is a helical compression spring as a second spring element 21, which presses piston 4 and force transmitter 9 apart; spring elements (not illustrated) other than a helical compression spring are also possible. Second spring element 21 has only a fraction of the elastic force of first spring element 8. The second spring element acts on piston 4 up to the point at which tappet 11 of force transmitter 9 contacts the base of depression 14 of piston 4. Second spring element 21 simulates a so-called "jump-in," i.e., a low actuating force of a master brake cylinder of a vehicle braking system until brake pads of hydraulic wheel brakes contact brake disks, brake drums, or other brake elements.

Flange 12 of force transmitter 9 includes three radially extending ribs 22 on its side facing piston 4, which are uniformly or nonuniformly distributed around the circumference of tappet 10. Second spring element 21 is supported on ribs 22, which via plastic compression allow setting of an elastic force of the second spring element, and thus allow the "jump-in."Flange 12 of force transmitter 9 may also include more than three ribs 22 or some other supports (not illustrated) for second spring element 21.

On the side of piston 4 facing away from cover 5, cylinder 3 of pedal travel simulator 1 is connected to the master brake cylinder, not illustrated, via a connecting bore 23, which in the exemplary embodiment is angled. Brake fluid that is displaced from the master brake cylinder into cylinder 3 of pedal travel simulator 1 upon actuation moves piston 4 of pedal travel simulator 1 until it strikes tappet 11 of force transmitter 9 at the base of depression 14 of piston 4 without a counterforce, subsequently against the low elastic force of second spring element 21, and as soon as tappet 11 of force transmitter 9 rests in depression 14 of piston 4, against the significantly higher elastic force of first spring element 8, spring elements 8, 21 generating the actuating force of the master brake cylinder via a hydraulic pressure in the brake fluid. A solenoid valve, via which pedal travel simulator 1 is connected to the master brake cylinder during a powered actuation of the vehicle braking system, is normally situated between the master brake cylinder and pedal travel simulator 1.

What is claimed is:

1. A pedal travel simulator for a hydraulic vehicle power braking system, the pedal travel simulator comprising:
   a cylinder in which a piston is axially displaceably accommodated;
   a cup-shaped cover that is situated in the cylinder, axially lengthening an interior holding region partly formed by the cylinder, and that closes an end face of the cylinder;
   a first spring element that is situated in the interior holding region, at least partly within the cover, and that acts on the piston to move the piston into the cylinder;
   a spring ring as a piston stop which is situated in a circumferential groove in the cylinder, between the piston and the end face of the cylinder, and which protrudes radially inwardly from the groove so that the spring ring limits a stroke of the piston in a direction towards the cover; and a tubular and radially elastic fitting that holds the first spring element in the cover.

2. The pedal travel simulator as recited in claim 1, wherein the holding of the first spring element in the cover by the fitting is via an outward radial force exerted by the fitting against an interior of the cover.

3. The pedal travel simulator as recited in claim 1, wherein the fitting is arranged so that at least a portion of the fitting is arranged inside the cover.

4. The pedal travel simulator as recited in claim 1, wherein the cylinder, the cover, and the fitting are arranged so that a portion of the cover is arranged between a radial interior of the cylinder and a radial exterior of the fitting, and a portion of the fitting is arranged between a radial interior of the cover and a radial exterior of the first spring element.

5. The pedal travel simulator as recited in claim 4, wherein another portion of the fitting, which is located at an axial region in which the cover is not located, is arranged radially between the radial interior of the cylinder and the radial exterior of the first spring element.

6. The pedal travel simulator as recited in claim 4, wherein the holding of the first spring element in the cover by the fitting is via an outward radial force exerted by the fitting against the radial interior of the cover.

7. The pedal travel simulator as recited in claim 1, further comprising:

a force transmitter that is situated between the piston and the first spring element and that transmits an elastic force of the first spring element to the piston, wherein the fitting holds the force transmitter in or at the cover.

8. The pedal travel simulator as recited in claim 7, further comprising:

a second spring element, with the first spring element pressing against a first surface of the force transmitter that faces away from the piston and towards the cover and the second spring element arranged so that the second spring element applies a force against a second surface of the force transmitter that faces towards the piston and away from the cover, the second spring element thereby pressing the piston and the force transmitter apart.

9. The pedal travel simulator as recited in claim 7, wherein the force transmitter protrudes into the first spring element.

10. The pedal travel simulator as recited in claim 1, wherein the fitting is clampingly held in the cover.

11. The pedal travel simulator as recited in claim 1, wherein a support disk is situated in the cover on a side of the first spring element facing away from the piston, and transfers the elastic force of the first spring element close to a circumference to the cover.

12. The pedal travel simulator as recited in claim 1, wherein the first spring element (i) applies the force (a) in a first direction towards a face of the cover that faces the piston and (b) in a second direction opposite the first direction towards the face of the piston that faces the cover, and (ii) is formed as a disk spring packet that includes a plurality of spring disks that are stacked one against another in the first and second directions.

13. A pedal travel simulator for a hydraulic vehicle power braking system, comprising:

a cylinder in which a piston is axially displaceably accommodated;

a cup-shaped cover that is situated in the cylinder, axially lengthening an interior holding region partly formed by the cylinder, and that closes an end face of the cylinder;

a first spring element that is situated in the interior holding region, at least partly within the cover, and that acts on the piston to move the piston into the cylinder; and a radially elastic spring ring as a piston stop which is situated in a circumferential groove in the cylinder at a location that is axially spaced apart from the cup-shaped cover, between the piston and the end face of the cylinder, and which protrudes radially inwardly from the groove so that the spring ring limits a stroke of the piston in a direction towards the cover.

14. The pedal travel simulator as recited in claim 13, further comprising:

a force transmitter that is situated between the piston and the first spring element and that transmits an elastic force of the first spring element to the piston; and a fitting that holds the first spring element in the cover and that also holds the force transmitter in or at the cover.

15. The pedal travel simulator as recited in claim 14, further comprising:

a second spring element, with the first spring element pressing against a first surface of the force transmitter that faces away from the piston and towards the cover and the second spring element arranged so that the second spring element applies a force against a second surface of the force transmitter that faces towards the piston and away from the cover, the second spring element thereby pressing the piston and the force transmitter apart.

16. The pedal travel simulator as recited in claim 14, wherein the force transmitter protrudes into the first spring element.

17. The pedal travel simulator as recited in claim 14, wherein the fitting is clampingly held in the cover.

18. The pedal travel simulator as recited in claim 13, wherein a support disk is situated in the cover on a side of the first spring element facing away from the piston, and transfers the elastic force of the first spring element close to a circumference to the cover.

19. The pedal travel simulator as recited in claim 13, wherein the first spring element (i) applies the force (a) in a first direction towards a face of the cover that faces the piston and (b) in a second direction opposite the first direction towards the face of the piston that faces the cover, and (ii) is formed as a disk spring packet that includes a plurality of spring disks that are stacked one against another in the first and second directions.

* * * * *